(No Model.)　　　　W. H. COULSON.　　　5 Sheets—Sheet 3.
GLAZED STRUCTURE.
No. 429,375.　　　　　　Patented June 3, 1890.
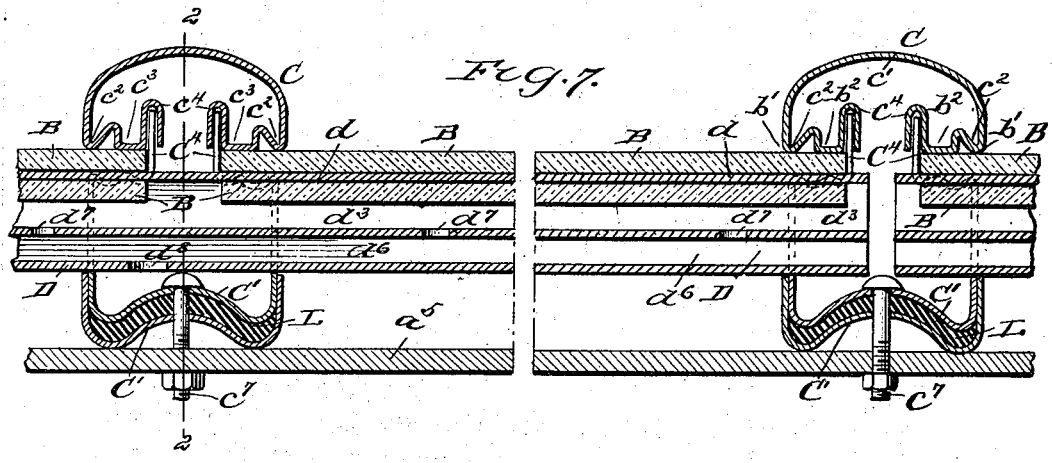
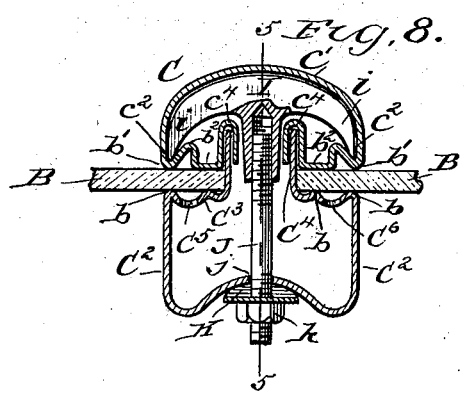
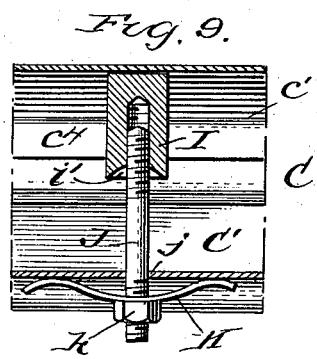
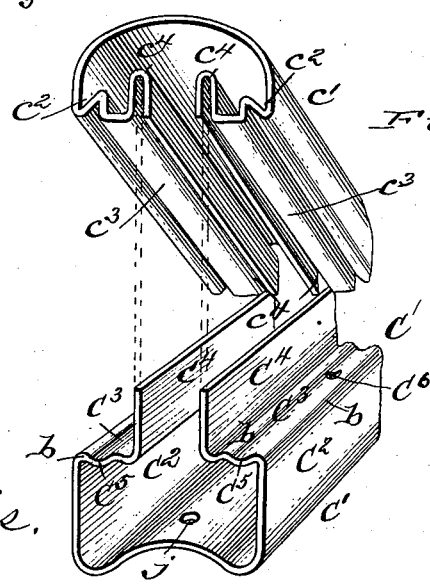
WITNESSES:　　　　　　　　　　　　　　INVENTOR:
W. R. Davis.　　　　　　　　　　　　　W. H. Coulson
C. Sedgwick　　　　　　　　　　　　BY Munn & Co.
　　　　　　　　　　　　　　　　　　　　ATTORNEYS

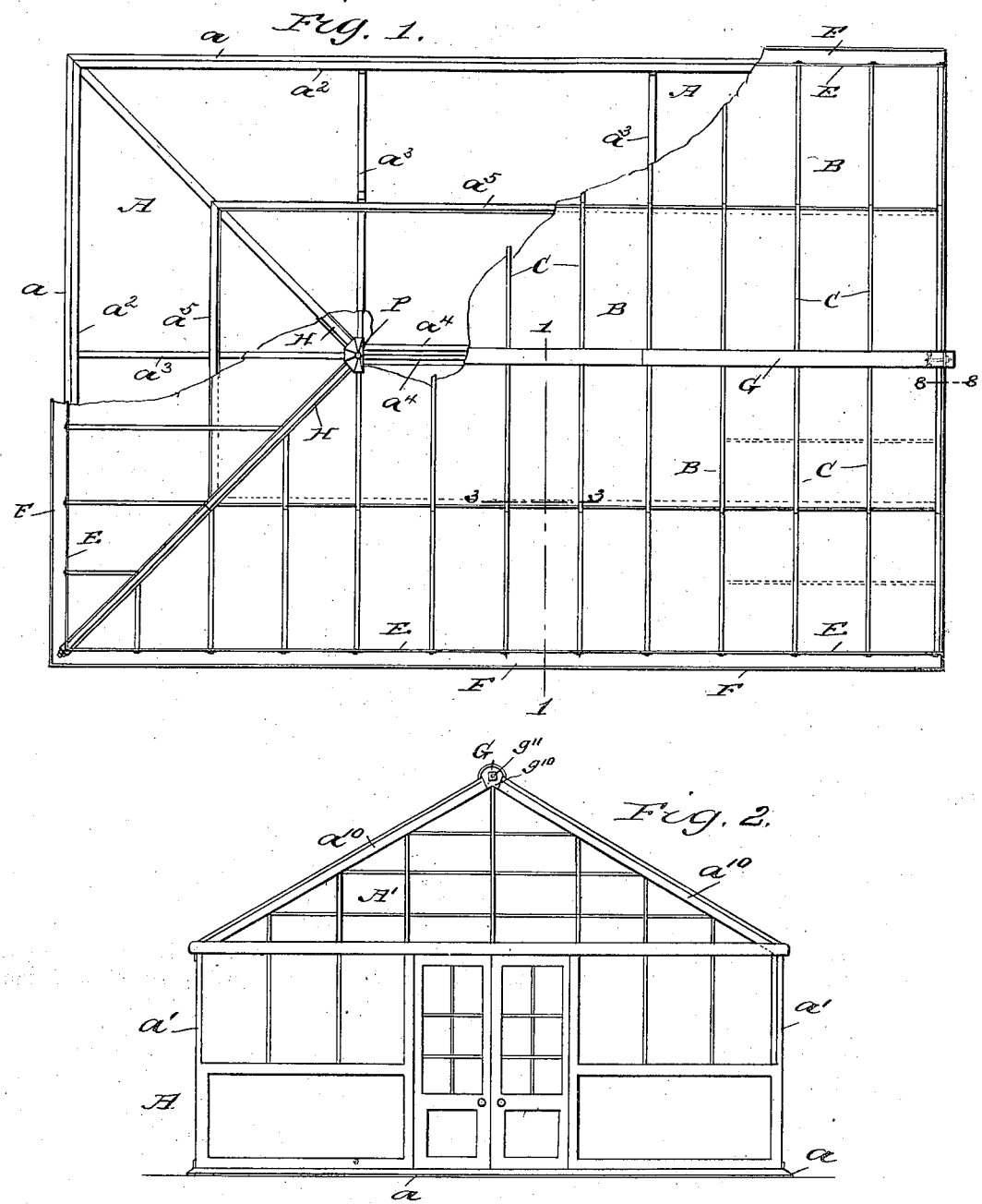

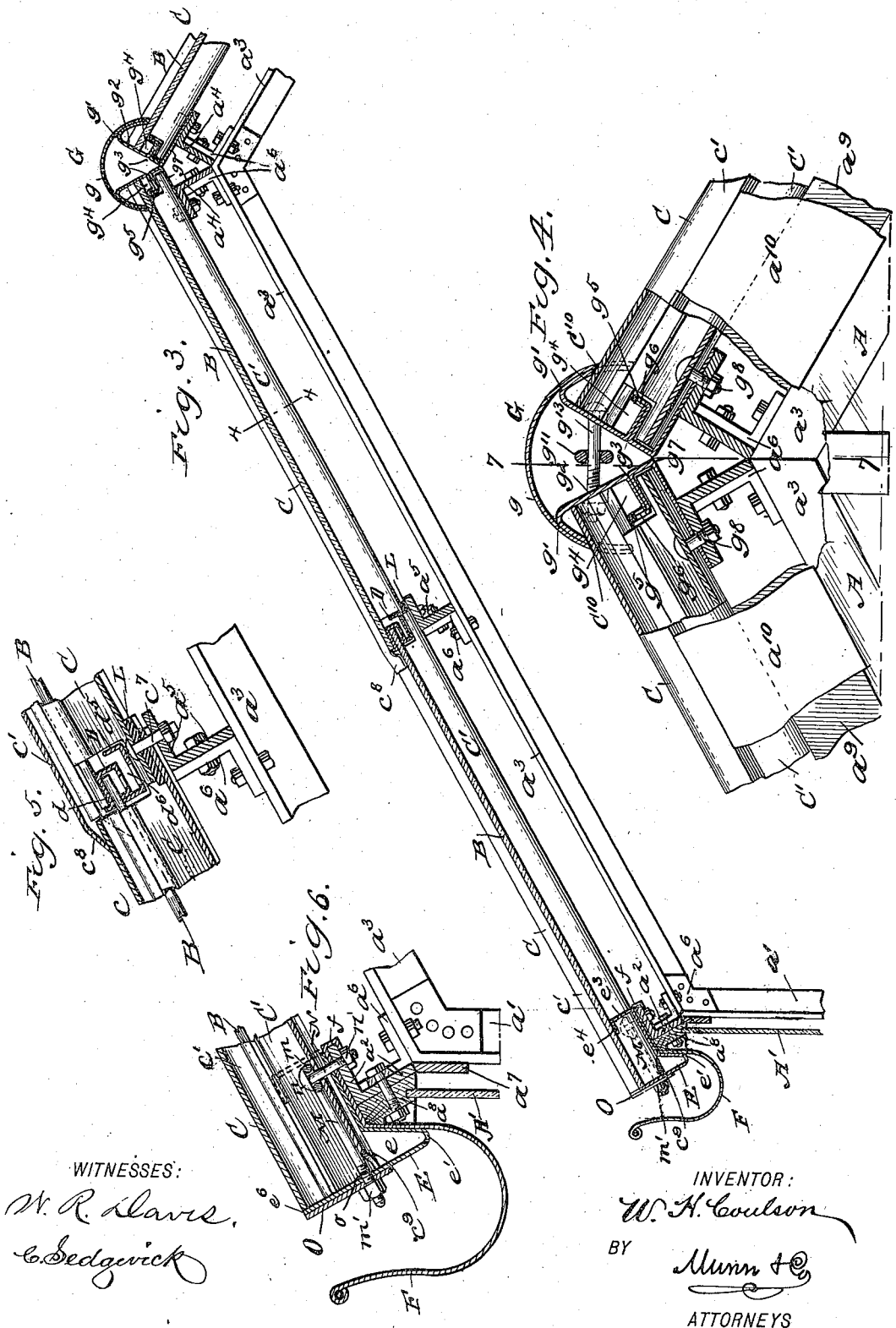

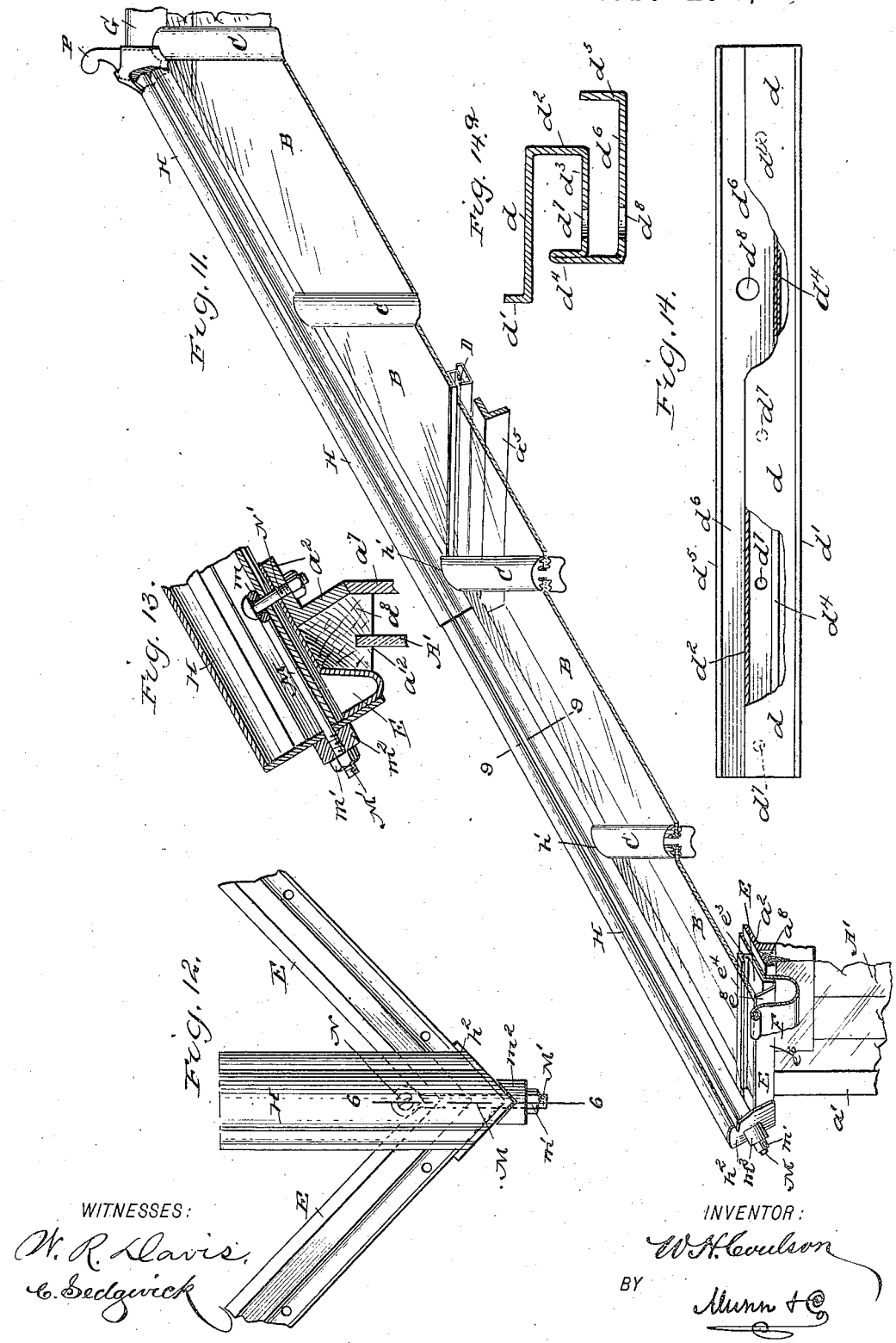

(No Model.)  W. H. COULSON.  5 Sheets—Sheet 5.
GLAZED STRUCTURE.
No. 429,375.  Patented June 3, 1890.
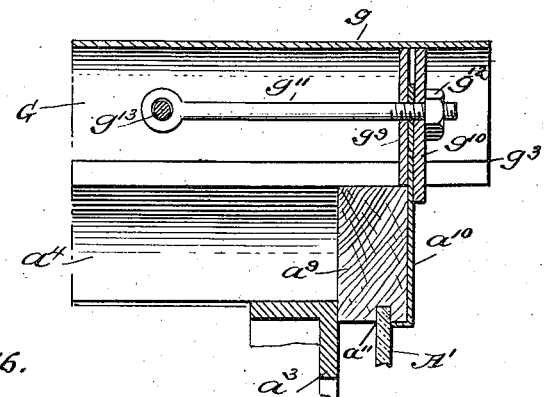
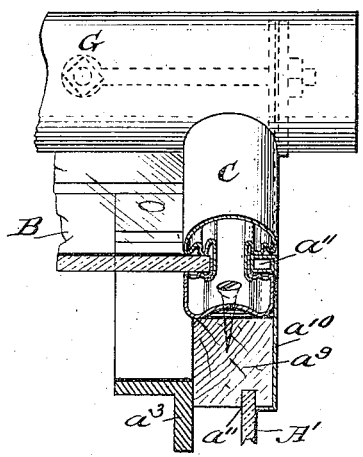
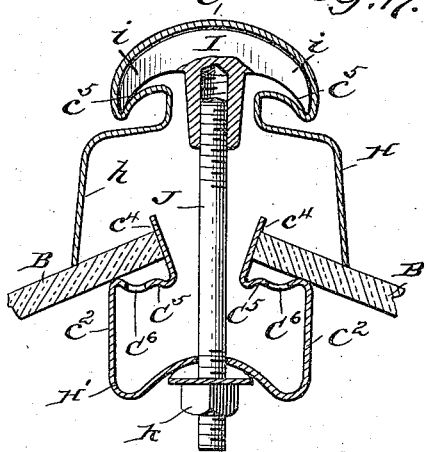
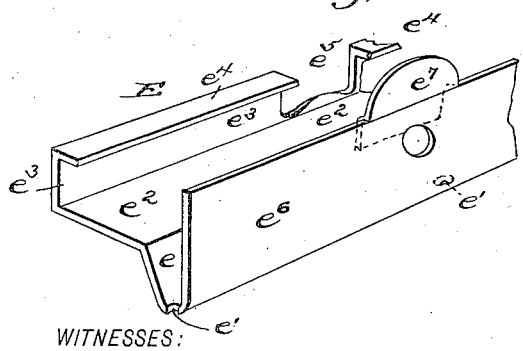
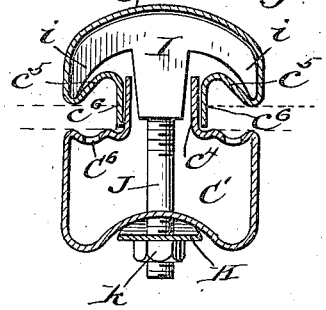
WITNESSES:
W. R. Davis
C. Sedgwick
INVENTOR:
W. H. Coulson
BY
Munn & Co.
ATTORNEYS

UNITED STATES PATENT OFFICE.

WILLIAM H. COULSON, OF JERSEY CITY, NEW JERSEY.

GLAZED STRUCTURE.

SPECIFICATION forming part of Letters Patent No. 429,375, dated June 3, 1890.

Application filed January 24, 1890. Serial No. 337,928. (No model.)

*To all whom it may concern:*

Be it known that I, WILLIAM HERBERT COULSON, of Jersey City, in the county of Hudson and State of New Jersey, have invented a new and useful Improvement in Glazed Structures, of which the following is a full, clear, and exact description.

My invention relates to an improvement in glazed structures, and has for its object to lay glass or similar substance in a metallic frame without the use of putty; and a further object of the invention is to accomplish this result in a very simple and practical manner and also to provide effectually for the disposal of water falling upon the structure and of condensed vapors.

The invention consists in the novel construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a plan view of a conservatory or glazed structure built in accordance with my invention and partly broken away. Fig. 2 is an end view of the said structure. Fig. 3 is an enlarged transverse vertical section taken on line 1 1 in Fig. 1. Fig. 4 is a still more enlarged transverse broken sectional view taken at the gable end of the ridge-bar of the structure. Fig. 5 is a longitudinal section through one of the lap-joints of the longitudinal bars of the structure, taken on the line 2 2 of Fig. 7, which view is drawn to a larger scale. Fig. 6 is an enlarged transverse section taken at the eaves of the structure and through one of the longitudinal roof-bars thereof. Fig. 7 is an enlarged transverse sectional view across two of the longitudinal roof-bars at the glass lap-bar, and taken on the line 3 3 of Fig. 1. Fig. 8 is a transverse section across one of the longitudinal roof-bars, taken on line 4 4 in Fig. 3. Fig. 9 is a detail longitudinal sectional view taken on the line 5 5 in Fig. 8. Fig. 10 is a detail perspective view showing parts of the upper and lower members of the longitudinal roof-bars. Fig. 11 is a sectional side elevation of one of the hip-bars of the roof and adjacent parts. Fig. 12 is a plan view of the outer end of the hip-bar and adjacent parts of the eaves-bar. Fig. 13 is a longitudinal sectional view of the lower end of the hip-bar, and taken on the line 6 6 in Fig. 12. Fig. 14 is a detail broken plan view of a portion of the lap-bars. Fig. $14^a$ is an enlarged cross-section of the lap-bar. Fig. 15 is a longitudinal vertical sectional view at the gable end of the ridge of the structure, and taken on the line 7 7 in Fig. 4. Fig. 16 is a side elevation of the gable end of the ridge with the outer longitudinal roof bar and frame in transverse section on the line 8 8 in Fig. 1. Fig. 17 is a transverse vertical section of the hip-bar, taken on the line 9 9 in Fig. 11. Fig. 18 is a perspective view of a part of the eaves-bar, and Fig. 19 shows a transverse section and modified form of the longitudinal roof or glazing bars of the structure.

My invention relates more especially to the roofs of glazed structures—such as conservatories or green-houses, skylights and the like; but certain parts of the invention may be adopted with advantage in building the side walls of such structures. Figs. 1 and 2 of the drawings represent top and gable end views of a glazed structure of this class, but drawn to a small scale, and to show in a general diagrammatic manner a conservatory about twenty-three feet long and fifteen feet wide and built almost entirely of iron and glass.

The frame A of the structure is made mainly of angle-iron sustained by a suitable sill-plate $a$, from which rise angle-iron posts $a'$, to which posts are connected the eaves-frame bars $a^2$, and from which angle-iron rafters $a^3$ extend to the roof ridge-piece, which consists, preferably, of two angle-iron bars $a^4$. One or more intermediate angle-iron purlins $a^5$ are used as the width of the roof requires, the pitch of the roof each way from the ridge-piece and down the hip to the eaves being about thirty degrees. The several parts of the frame are secured together by a bolted plate or angle-iron-brace $a^6$, as clearly shown in the larger detail views of the drawings.

A flat metal brace-bar $a^7$ extends around the structure under the eaves-frame bar $a^2$, and to the outside of this bar $a^2$ is bolted or secured a wooden rail $a^8$, having a vertical outer face and a slanting upper edge to properly sustain the sheet-metal main gutter and eaves-bars of the structure, as hereinafter explained.

At the vertical gable end of the structure a couple of wooden rails or strips $a^9$ are fastened to the metal frame next the outermost rafters $a^3$, which provide a bearing for the two longitudinal sheet-metal glazing-bars at that end of the structure, and also separate sheet-metal flashings $a^{10}$, each of which enters a groove in the longitudinal bar and extends down over the face of the wooden rail $a^9$, being bent in at the bottom to finish next or at a groove $a^{11}$, produced in the lower edges of the bars $a^9$, and a like groove $a^{12}$ is formed in the lower edge of the wooden eaves-rail $a^8$, intended, as is the groove $a^{11}$, to receive the top of the glass, the weather-boarding or sheathing A' of the side walls of the structure, as shown in Figs. 3, 6, 15, and 16.

In the structure shown in Figs. 1 and 2 of the drawings there is but one purlin between the ridge and the eaves, and the roof-glass is lapped but once between these points, two sheets B of glass—say twenty-two by forty inches in area—extending the full length of one slanting side of the roof; but the intermediate dotted lines at the right-hand corner of Fig. 1 indicate that the roof-glass may be only about one-half the length above named. Wherever the glass laps a lap-bar of peculiar construction is provided, as presently described.

In explaining the further numerous details of my invention I will first particularly describe one of the longitudinal sheet-metal glass holding or glazing bars C relatively with the intermediate lap-bar D, the lower sheet-metal eaves-bar E, the gutter F, and the ridge-bar G, and later I will explain the detailed construction of the ridge-bar and the corner roof-bar H at the hipped or slanting end of the roof and their correlated parts.

The details of construction of the longitudinal glazing-bars C is perhaps best shown in Figs. 3 to 10, inclusive, of the drawings. Each of these bars consists of two parts, a lower part C', which for convenience I call the "rail," and an upper part $c'$, which I term the "cap." The rail is made from a strip of sheet metal, preferably galvanized iron, and is ordinarily concaved along its bottom, whence the metal is bent upward, forming opposite parallel sides $C^2 C^2$, and then the metal is bent inward from each side to form opposite transversely-corrugated portions $C^3$, upon which the edges of two adjacent sheets of glass B B rest, and two final upper bends are given the edges of the sheet to form two longitudinally-ranging vertical tongues or flanges $C^4 C^4$, which are adapted to enter upwardly-projecting bends or longitudinal loops $c^4 c^4$, formed at opposite edges of the cap $c'$. The opposite ledges $C^3 C^3$ of the bar-rail C' may be transversely concaved directly from the sides $C^2$ of the rail to its outer face and a slanting upper edge to properly sustain the sheet-metal main gutter and eaves-bars of the structure, as hereinafter explained.

tongues $C^4$; but I prefer to corrugate these ledges to form in each two parallel concavities or gutters, and to provide the outer larger gutters $C^5 C^5$ with a series of holes $C^6$, allowing the drip or passage of water of condensation from the under side of the glass B, or of any water which may perchance drive in beneath the bar-cap $c'$ around the edge of the glass to the interior of the bar-rail, down which it will flow to the eaves-bar and gutter. By thus corrugating each ledge $C^3$ of the rail to form in it two parallel gutters I also obtain two independent bearing points or plates $b b$ for each sheet of glass B, or one bearing at each side of each gutter $C^5$ of the rail. This double bearing for each sheet of glass is most desirable and materially assists in holding it securely in place when clamped by the bar-cap and nut and bolt, as presently explained. The bar-cap $c'$ is bent from one piece of sheet metal, the edges of which are shaped into the loops $c^4 c^4$, receiving the bar-rail flanges or tongues $C^4 C^4$, as above explained. Outside of these loops $c^4 c^4$ each side part of the cap is bent horizontally to form a channeled or grooved flat bottom portion $c^3$, and laterally beyond this is bent upward and then downward and outward to form an angular chamber or groove $c^2$, into which enters the hook end $i$ of a clamping-nut I, which is slipped into the cap from its open end, and is then pushed along by an inserted rod to the place where it is required to act upon the cap. The top portion of the bar-cap is transversely convexed, and the nut I is shaped to conform to it and has a central pendent stem which passes between the loops $c^4 c^4$ and is bored and adapted to receive the upper screw-threaded end of a bolt or bolt end J, which is passed upward through a hole $j$ in the bottom of the bar-rail. Upon this bolt J, inside of its nut $k$, is placed a suitable spring, preferably a spring-plate K, which, while allowing the bar-cap $c'$ to be pressed down upon the glasses B B to clamp them between the rail and cap with sufficient firmness to give security, will also yield sufficiently after the bolt-nut is tightened as much as it should be to accommodate all contraction or expansion of the metal of the bar to hold the glass properly and without danger of breaking it, irrespective of more or less sudden or extreme changes of temperature.

It will be noticed that the channels or grooves $c^2 c^3$ of the bar-cap $c'$ provide two independent bearings $b' b^2$ of the cap on each sheet of glass B held in the bar, and that the loops $c^4$, the flanges $C^4$, and the bolt-fastenings allow use of the same-sized glazing-bar with glass of different thickness—say from one-eighth to three-eighths of an inch thick—without danger of excessive passage of water into the interior of the bar, as the flanges $C^4$ will still enter or be lapped by the loops $c^4$ even when the thickest glass is employed.

I here especially mention the preferred concaved form of the bottom of the bar-rail C', as it not only holds the preferred plate-springs K against turning around out of effective operative position, but it also prevents leakage of water into the interior of the structure through the hole $j$, through which the cap-fastening bolt J passes, as this hole is in the arched central part of the bar-rail, which is considerably higher than the two gutters each side of it, and down which the water entering the rail through its holes $C^6$ passes to the eaves-bar and main gutter. Another advantage of the transversely-concaved bottom of the bar-rail is that it affords a substantial non-rocking bearing for the bar at two places upon the supporting angle-iron-frame bar of the structure, whereby lateral oscillation of the bar is prevented, and this materially enhances the stability of the entire structure. Another important advantage of this bar and mode of fastening the glass is that the nuts of the fastening-bolts J, of which there may be any required number, are inside the building and cannot be tampered with from the outside except by breaking the glass. Another advantage of the bar and fastening is that the hook-head of the clamp-nut I by engaging the grooves $c^2$ $c^2$ at opposite sides of the bar-cap $c'$ positively prevents lateral spreading of the cap and also of the rail $C'$, the flanges $C^4$ of which enter the cap-loops $c^4$.

I will here refer to the modified form of the longitudinal glazing-bars shown in Fig. 19 of the drawings. This bar differs from the one last above described only in the form of the cap, which, instead of having its lower part at each side formed with grooves or recesses $c^2$ $b^2$ and loop $c^4$, is formed simply with one groove or recess $c^5$, (like the one $c^2$, but larger,) and with a dependent flange $c^6$, which lies outside the upturned flange or tongue $C^4$ of the bar-rail. The fastening-nut I, bolt J, and nut and spring $k$ and K are used substantially as above described, and the nut I prevents lateral spreading of both the cap and the rail of the bar.

Fig. 9 of the drawings shows that the lower end or face of the clamp-nut I is concaved or countersunk at $i'$ toward the screw-threaded hole receiving the bolt J and in a direction lengthwise of the glazing-bar. The object of this concavity $i'$ is to allow the clamp-nut to be more easily shifted along to find position within the glazing-bar by means of an awl or rod, for instance, inserted through the bolt-hole $j$ of the bar from beneath, to properly set the clamp-nut to bring its threaded bore directly in line with the bolt-hole $j$ to assure easy adjustment of the bolt J from beneath the bar. This final adjustment of the clamp-nut I is made after it is shifted along to an approximately proper position by the rod inserted at or from the end of the bar. This approximately proper position of the clamp-nut may be assured by pushing it along within the bar until it strikes an awl or rod passed upward through the bar bolt-hole $j$, whereupon the awl or rod may itself be passed into the countersink $i^4$ of the nut and into the tapped hole thereof to finally adjust the clamp-nut to receive the bolt, as above described.

I will next describe the construction at the lap-joint of the glass, and where the lap-bar D is used in combination with the longitudinal glazing-bar C. It will be understood that in skylights or in other comparatively small glazed structures the bars C and sheets of glass B will extend clear from the ridge to the eaves; but in larger structures one or more laps of glass may be required, and in this construction I prefer to make the glazing-bars in two or more lengths and join them at the glass lap or laps and immediately above the purlin. I will explain the construction of the lap-joint with more particular reference to Figs. 3, 5, 7, and 13 of the drawings, as follows: The lap-bar D will of course extend the whole length of the roof at the glass laps, and where the structure is too long for one length of lap-bar this bar will be formed of two or more aligned bars. In the conservatory shown the lap-bar is formed of two parts the adjacent ends of which are separated a little about at the center of one of the glazing-bars C, as shown at the right-hand end of Fig. 7 of the drawings, and for a purpose presently explained. The lap-bar D has a peculiar cross-sectional form. (Best shown in Figs. 5, 14, and 14$^a$.) It is bent from a sheet of metal preferably somewhat thinner and more ductile than the metal of the longitudinal glazing-bars C, with which it connects. The upper flat portion $d$ of the lap-bar forms a bed or support for the lower end of the upper sheet of glass B, and is provided with an upturned rear flange $d'$, which forms a stop to prevent the glass from slipping downward. At the forward or upper edge it has a downward bend $d^2$, which forms a stop to the upper end of the lower sheet of glass B, and from this downward bend the metal is bent rearward and then upward to form a gutter $d^3$ under the upper end of the glass, which rests on top of the vertically-doubled bend or flange $d^4$ of the metal which forms the lower side wall of said gutter. The top of the lower sheet of glass is always supposed to fit rather closely between the top part $d$ of the lap-bar and the top of the flange $d^4$, the flexibility of the metal allowing the bar to be easily bent or set to hold or clamp the glass in this manner. From the double flange $d^4$ the metal is bent downward and then rearward, and finally upward at $d^5$ at a point a little beyond or above the upper wall of the gutter $d^3$ to form below it a second gutter $d^6$. At intervals of about a foot (more or less) the bottom or floor of the lap-bar gutter $d^3$ is perforated, as at $d^7$, to allow free fall or flow into the lower gutter $d^6$ of any water which may perchance beat into said gutter $d^3$ under the lap-bar part or plate $d$, and over past the top of the lower sheet of glass, and the bottom or floor of the lower gutter is perforated at $d^8$ only within the lower rails of the longitudinal bars C, through which the lap-bar passes, to allow all drip from the lap-bar to pass into the longitudinal bars and thence downward to the main gutter.

The especial object of carrying the floor of the lower gutter $d^6$ and its upper flange $d^5$ forward beyond the wall $d^2$ is to give entrance to the gutter $d^6$, past the wall $d^2$, of water of condensation which would collect on and flow down the inner face of the upper sheet of glass, and allow the lap-bar to carry off this water also, to the longitudinal bar and thence to the main gutter, and provide for keeping the interior of the structure entirely dry.

It is quite immaterial whether the glass-retaining flange $d'$ of the lap-bar be located in line with the lower double side wall $d^4$ of the gutter $d^3$, as shown in Figs. 3 and 5, or whether the flanges $d'$ set quite a little distance below or back of the lap-bar wall $d^4$, as shown in Figs. 14 and 14$^a$.

In fitting the lap-bar to the longitudinal glazing-bars the lower part or rails of the bars are cut away at their upper parts to allow the lap-bar or its two gutter portions $d^3$ and $d^6$ to be fitted in or through the longitudinal glazing-bar at this joint, which is formed by lapping the end portions of the upper and lower sections of the glazing-bar, and a bolt $c^7$, passed through said lap ends, and an interposed packing L, and the purlin $a^5$, on which they rest. The lower end of the upper portion of the longitudinal glazing-bar laps above and within the upper end of the lower part of the bar, so as to conduct water safely past the joint on its way from the ridge to the eaves of the structure.

An important feature of my invention, pertaining to the upper and lower longitudinal bar-sections C C and the lap-bar D, is that the rails C' C' of both bar-sections bear snugly and closely on the under side of the respective upper and lower glasses B B. As the upper glass rests on the flat part $d$ of the lap-bar, which itself rests upon the lower glass, it is manifest that as the lower rail C' of the upper and lower sections of the longitudinal glazing-bars are of like size the packing L, which is interposed between the lapped ends of the upper and lower sections of the longitudinal glazing-bars, should be about as thick as the upper sheet of glass and the part $d$ of the lap-bar.

The packing, which may be of rubber or any other suitable material, is closely held in place at the lap-joint by the bolt $c^7$, the nut of which is also inside the house, so that it cannot be tampered with from the outside. The lower end of the cap $c'$ of the upper glazing-bar section is lapped some little distance at $c^3$ onto the upper end part of the lower bar-section cap, to which the lap-bar flange $d'$ forms a stop in setting the glass. I especially mention the fact that with longitudinal glazing-bars and a lap-bar constructed as above described the opposite side edges of every sheet of glass may be parallel with the side edges of every other sheet of glass in the roof or wall. In other words, the construction and arrangement of the longitudinal bars C and lap-bar D are such that there is no lateral or side lappings of upper and lower lengths of a longitudinal bar where the edges of the upper and lower glass sheets would be obliged to cross laterally-lapped parts of longitudinal glazing-bars, as in other systems of glazing of this general character; and the side edges of the glass sheets may be, if desired, fitted much more snugly sidewise, or quite closely to the longitudinal bar-flanges $C^4$ all the way down the roof from the ridge to the eaves irrespective of the number of lap-bars D which may be employed.

I will now particularly describe the construction at the eaves of the structure, but not at the hip-bar H, and with more particular reference to Figs. 3, 6, and 18 of the drawings, as follows: The eaves-bar E, which is formed from sheet metal, may be fastened directly to the wooden eaves rail or strip $a^8$ and the eaves-frame bar $a^2$; but I prefer to first lay the inner bent part of the main gutter F onto the parts $a^8$ and $a^2$ and bend the inner end of the gutter around and under the inner end of the bar $a^2$, as shown at $f$, and then lay the eaves-bar E onto the gutter, and secure all to the frame by eye clamp-bolts M and ordinary bolts N, as presently described. The eaves-bar E has a pendent trough or gutter portion $e$, which is pierced at intervals with a series of holes $e'$ at the bottom to allow water passing into it from the glazing-bars C to flow off to the main gutter F. The main body or plate portion $e^2$ of the eaves-bar, which rests on the gutter-flange or on the eaves-frame bar $a^2$, is extended inward from the gutter $e$ for a few inches, and at its rear edge the metal is bent upward to form a wall $e^3$, which at its upper edge is preferably provided with an outbent flange $e^4$, which bears against the under face of the glass B and shuts out from the interior of the structure air which would otherwise enter it through the water-drip holes or passages $e'$. Where the longitudinal glazing-bars C meet the eaves-bar, the latter is cut out at $e^5$ to allow the bar C to lie on the plate $e^2$ for substantial support, and also to allow the bar C to bear at its outer end against the outer wall $e^6$ of the eaves-bar, which where the bar C strikes it is provided with an upwardly-projecting lip or flange $e^7$, which comes in front of the cap $c'$ of the bar C. The wall $e^6$ rises at $e^8$ in front of the lower edges of the glass sheets B to retain them in place, as best illustrated in Fig. 11. Where the longitudinal glazing-bars C abut the eaves-bar they are preferably soldered to it. Were the inner-wall flange $e^4$ dispensed with, the said wall $e^3$ would itself touch the lower face of the bottom sheet of glass and exclude air, which would otherwise enter the structure through the drip-holes $e'$; but the use of this flange $e^4$ is preferable, as it has a more or less elastic bearing upon the glass, which maintains comparatively close or tight joints of the eaves-bar therewith.

In fastening the eaves-bar and main gutter, and consequently securing the longitudinal bars and the glass, I prefer to re-enforce the outer plate $e^6$ of the eaves-bar by a clip-plate O, through which and a hole $o$ in said plate $e^6$ the outer screw-threaded end of the bolt M is passed from inside the eaves-bar. This bolt M lies within the rail C' of the longitudinal bar C, and at its inner end has an eye or loop $m$, through which is passed the fastening-bolt N, which also passes through the eaves-bar and gutter-flanges and the eaves-frame bar or angle-iron $a^2$, and when the nut $n'$ of the bolt N is tightened below the bar $a^2$ and the nut $m'$ of the bolt M is tightened outside the clip-plate O the entire structure at the eaves will be substantially secured.

The lower part of the rail C' of each of the longitudinal glazing-bars C is preferably cut out or away at $c^9$ to allow free flow of water from the bars to the eaves-bar and gutter. This allows the bar-rails C' to abut the eaves-bar wall $e^6$, and somewhat relieves the dragging strain on the fastening-bolts.

I will next particularly describe the construction of the straight metal ridge bar or piece G and the relation of the glazing-bars C therewith as follows, and with more especial reference to Figs. 1, 3, 4, 15, and 16: At the point of junction of the main ridge-bar G with the two diagonally-slanting hip-bars H H of the roof I prefer to fasten to the frame a suitable ornamental crest or finial P, to which the three bars G H and H are fitted, the bar G being abutted against and soldered to the inner flat vertical face of the ornament. The ridge-bar G is made, preferably, from one sheet of metal bent laterally each way from its center to form the transversely-arched cap $g$, from each lower edge of which the metal is bent back or doubled onto itself to increase the stiffness of the bar to a point $g'$, and thence the metal is bent downward and inward at $g^2$ toward a vertical line to a point $g^3$, where the metal is doubled upon itself to form a gutter $g^4$, the outer wall or flange $g^5$ of which is apertured at $g^6$ at the center of each of the longitudinal glazing-bars C, which are slipped into openings $C^{10}$, formed by cutting away the upper outer doubled part of the ridge-bar. From the point $g^3$ the metal is again bent downward in the plane of the part $g^2$ about to the transverse center of the ridge-bar, and thence the metal is finally bent downward and outward at $g^7$ about in line with the plane of the pitch of the roof, and so that each side flange $g^7$ rests firmly upon one of the ridge-piece angle-irons $a^4$, to which both flanges are secured by bolts $g^8$, which also pass through and secure the rails C' of the longitudinal glazing-bars C to the ridge angle-irons. By reason of the gutter $g^4$ having an outlet in the various glazing-bars any water that may enter between the ridge-bar and the glazing-bars will find its way to the gutters $g^4$ without entering the interior of the structure and be delivered to the rail-sections of the glazing-bars, and from thence through suitable apertures produced in their lower ends into the trough-section of the eaves-bar and the eaves-trough proper.

At the gable end of the structure the ridge-bar is closed by reason of the flashing $a^{10}$ extending upward therein, and re-enforcing plates $g^9$ and $g^{10}$ placed one at each side of the flashing, as illustrated in Fig. 15. The plates and the flashing are held in position by a clamp-bolt $g^{11}$, threaded at its outer end and provided with an eye at its inner end, the threaded extremity being passed through the flashing and the re-enforcing plates and provided outside of the same with a lock-nut $g^{12}$. The clamp-bolt is retained in the horizontal position within the ridge-bar by a tie-bolt $g^{13}$, which passes through the eye of the said clamp-bolt and the walls $g^2$ of the ridge-bar. (See Figs. 4 and 15.)

The glazing-bars C at the gable end of the structure are not held together by clamping bolts and nuts I and J, as are the others, the sections thereof being made to slide or dove-tail one in the other, as shown in Fig. 16, and the flashing $a^{10}$, parallel with this gable glazing-bar, is bent over upon itself at the upper end to an essentially rectangular shape, and the said rectangular portion enters and is held in the outer side groove of the bar, as illustrated at $a^{11}$ in Fig. 16. The hip-bars H are very similar in construction to the glazing-bars C, the lower section H' having a longitudinal groove in its under face, straight parallel sides $C^2$, and the upper apertured gutters $C^5$. The flanges $C^4$, however, are bent at an angle upward, as best shown in Fig. 17. The cap-section is much larger at its lower end, the cylindrical upper portion remaining the same. The glass B abuts with the flanges which extend above them, and the lower or body portion of the cap $h$ is curved horizontally outward from its junction with the cylindrical portion, and the sides extend downward to a contact with the glass, the said sides being provided with recesses $h'$ to receive and fit to the contour of the approaching ends of the glazing-bars, as shown in Fig. 11.

The eaves-bars E form a miter at the lower ends of the hip-bars, and therefore angular cover-plates $h^2$ are employed to close the lower extremities of the hip-bars, which cover-plates are held in contact with the latter and the eaves-bars in similar manner as the cover-plates of the glazing-bars are retained in position.

It will be observed that a roof constructed as herein set forth is extremely strong and durable, and that such ample provision is made for the conduct of rain or melted snow or vapor to the eaves-trough from every portion of the roof that leakage of any description is rendered almost impossibe.

It will be further observed that the glass is held firmly to place in a simple and effective manner, and that no rough or unprotected joints occur at any point, even where the glass plates overlap and the short lengths of the lap-bars, and glazing and hip bars, when used, are connected.

Having thus described my invention, I claim as new and desire to secure by Letters Patent—

1. In a glazed structure, the combination, with a hollow ridge-bar and series of hollow glazing-bars having a connection with the ridge-bar, of eaves-bars located beneath the lower extremities of the glazing-bars, and an eaves-trough located beneath the eaves-bar, communication being established between the glazing-bars, the eaves-bars, and the eaves-trough, substantially as and for the purpose specified.

2. In a glazed structure, the combination, with a hollow ridge-bar provided with a longitudinal gutter, and glazing-bars constructed in two hollow sections connected at their upper ends with the ridge-bar and provided with gutters having communication with the interior, of eaves-bars located beneath the lower ends of the glazing-bars, provided with an apertured trough-section, having communication with the interior of the glazing-bars, an eaves-trough located beneath the eaves-bars to receive the drip therefrom, and glass panes having their edges tied between the sections of the glazing-bars, the outer wall of the eaves-bars forming a stop for the lower ends of the glass panes, substantially as shown and described.

3. In a glazed structure, the combination, with a hollow ridge-bar provided with longitudinal gutters, glazing-bars constructed in lengths, each length being formed of two hollow sections having a space between them, the lower wall of which space is provided with an apertured gutter leading to the interior, and lap-bars fastened to the glazing-bars at the overlapping of their lengths, the said lap-bars being formed with an upper supporting-section and two gutter-sections located one below the other, the said gutter-sections having communication with each other and with the interior of the glazing-bars, of eaves-bars located beneath the lower ends of the glazing-bars, provided with an apertured gutter-section and having communication with the interior of the glazing-bars, eaves-troughs located beneath the eaves-bars, and hip-bars receiving the ends of several of the glazing-bars, the said hip-bars being constructed in essentially a similar manner to the glazing-bars, substantially as shown and described.

4. In a glazed structure, a glazing-bar consisting of a lower rail-section provided at its upper face each side of the center with a gutter and an upwardly-extending flange, and a cap-section having communication with the rail-section and provided upon its inner side with loops adapted to receive the flanges of the rail-section, substantially as shown and described.

5. In a glazed structure, a glazing-bar consisting of a lower tubular rail-section provided at its upper face each side of the center with a gutter having openings therein and an essentially vertical flange at the inner side of the gutters, and a tubular cap having communication with the interior of the rail, the under surface whereof extends essentially horizontally over the gutter-surface of the rail-section, the said under surface of the cap-section terminating at each side of its center with a loop to receive flanges of the rail-section, substantially as specified.

6. In a glazed structure, the combination, with the tubular body or rail of a glazing-bar provided at its upper face with apertured gutters and an upwardly-extending flange at each side of its center, of a tubular cap-section provided with an essentially horizontal under surface near its sides and loops adapted to receive the rail-flanges, and means, substantially as shown and described, for tying the cap-section to the rail-section, as and for the purpose specified.

7. In a glazed structure, the combination, with the tubular body or rail of a glazing-bar open at the top and having its inner ends flanged upward and provided with an apertured gutter between its outer side surfaces and flanges, of a tubular cap-section having essentially angular outer edges and provided with a central opening in its under surface and a loop and horizontal surface at each side of the opening, transparent panes inserted between the contiguous surfaces of the cap and rail over the gutter of the latter to a bearing against its flanges, and means, substantially as described, for binding the panes between the sections of the glazing-bar and tying the said sections to each other, substantially as specified.

8. In a glazed structure, the combination, with the tubular body or rail of a glazing-bar having an opening at its top, and the walls of which opening are flanged upward and provided with apertured gutters between the flanges and the upper outer side walls, of a tubular cap-section having an opening in its under face communicating with the interior of the rail-section, the walls of which opening contact with the flanges of the rail-section, a nut fitted essentially to the inner contour of the cap-section, and a bolt passed through the rail-section into the said nut, substantially as specified.

9. In a glazed structure, the combination, with a glazing-bar consisting of a hollow essentially rectangular body or rail section having an opening in its top, a flange at each side of the opening and a gutter near said flanges, and a hollow cap-section having a cylindrical upper surface and an opening in its under face, the walls whereof contact with the rail-flanges, the said cap-section being also provided with essentially angular lower side edges, of a clamping-nut shaped to the cylindrical contour of the cap and provided with a shank having a threaded bore extending downward into the rail-section, and a tie-bolt passed through the bottom of the rail-section into the shank-bore of the nut, substantially as shown and described.

10. In a glazed structure, the combination, with a glazing-bar consisting of a hollow essentially rectangular body or rail section having an opening in its top, a flange at each side of the opening and a gutter near said flanges, and a hollow cap-section having a cylindrical upper surface and an opening in its under face, the walls whereof contact with the rail-flanges, the said cap-section being also provided with essentially angular lower side edges, of a clamping-nut shaped to the cylindrical contour of the cap and provided with a shank having an interior bore integral with its under surface, a bolt passed through the bottom of the rail-section into the shank of the nut and provided with a lock-nut at its lower end, and a spring located between said nut and the bottom of the rail-section, substantially as shown and described, and for the purpose specified.

11. In a glazed structure, the combination, with a glazing-bar consisting of a tubular lower or rail-section having a convexed bottom and a cap-section provided with a cylindrical upper surface having communication and contact with the rail-section, of a clamping-nut shaped to the cylindrical contour of the cap and provided with an integral shank having a concaved lower end and a threaded bore, a bolt threaded at both ends passed through the bottom of the rail into the bore of the clamping-nut, a spring-plate inserted upon the lower end of the bolt, having a bearing against the under concaved surface of the rail-section, and a lock-nut binding the spring to place, substantially as shown and described.

12. In a glazed structure, a lap-bar consisting of flexible metal bent to form an upper platform provided with a flange at one side, a gutter beneath said platform, and a second or lower gutter extending beneath the first gutter, substantially as specified.

13. In a glazed structure, a lap-bar adapted to seal and support the opposed edges of glass panes, consisting of a metal-plate bent to form an upper platform provided with a flange at one side, a perforated gutter beneath the same, having one side of less height than the other, and a second lower gutter extending beyond the higher side wall of the upper gutter and having an upturned flange at its upper end, substantially as specified.

14. In a glazed structure, the combination, with the glazing-bars constructed with a lower tubular rail-section and an upper tubular cap-section, of lap-bars extending into the lower sections of the glazing-bars, consisting of metal bent to form an upper platform having a flange at one side, a perforated gutter beneath the same, and a second lower gutter extending beyond one side of the upper gutter, the said lower gutter being provided with openings leading into the glazing-bars, substantially as specified.

15. In a glazed structure, the combination, with the glazing-bars constructed with a lower tubular rail-section and an opposed tubular cap-section, and panes of glass clamped between the sections of the bars and overlapped at their ends, of lap-bars extending into the lower sections of the glazing-bars, consisting of metal bent to form an upper platform having a flange at one side and adapted to support the lower end of the upper glass pane, a perforated gutter beneath the same, having one wall of less height than the other, the upper edge of the lower glass pane being adapted to rest upon the shorter wall of said gutter and extend upward over the same, and a second lower gutter extending beyond one side of the upper gutter, the said lower gutter being provided with openings leading into the glazing-bars, substantially as specified, whereby any vapor, rain, or melted snow finding its way between the overlapping joints of the glass panes will be conducted into the glazing-bars, as specified.

16. In a glazed structure, an eaves-bar constructed substantially as described, the same consisting of a metal plate bent to form a central flat body or bearing-surface, an apertured trough at the outer or front side, the outer wall of which trough extends beyond the plane of the body-surface, and the perpendicular rear wall extending upward from the rear side of the body-surface and having an outwardly-projecting flange on its upper edge, substantially as specified.

17. In a glazed structure, an eaves-bar constructed substantially as described, the same consisting of a metal plate bent to form a central flat body or bearing-surface, an apertured trough at the outer or front side, the outer wall of which trough extends above the plane of the body-surface, a perpendicular rear wall extending upward from the rear side of the body and provided with a forwardly-bent horizontal flange, the said rear wall and its flange being recessed at intervals to receive the glazing-bars of the structure, substantially as specified.

18. The combination, with an eaves-bar, the same consisting of a metal plate bent to form a flat body, an apertured trough at the forward or outer end of the body, the outer wall of which is projected above the plane of the body, and a perpendicular wall extending upward from the inner or rear side of the body, of an eaves-trough attached to the body of the eaves-bar and extending beneath and beyond the trough-section of said eaves-bar, substantially as specified.

19. In a glazed structure, the combination, with the eaves-rail and eaves-frame of the structure and an eaves-trough secured to the same, of an eaves-bar also attached to the said rail and frame, consisting of a flat body portion, an apertured trough formed at the outer side of the body projecting within the eaves-trough, and a wall extending upward from the inner or rear side of the body and provided with a forwardly-disposed horizontal flange, the said wall and flange being recessed to receive the glazing-bars of the structure, substantially as and for the purpose specified.

20. In a glazed structure, the combination, with the eaves-rail and the eaves-frame bar of a structure, and an eaves-trough secured to the said bar and rail, of an eaves-bar consisting of a flat body portion, an apertured trough formed at the outer side of the body projecting downward within the eaves-trough, the outer wall of which extends above said body, an upwardly-extending perpendicular wall at the rear side of said body, provided with an upwardly-extending horizontal flange, the said wall and flange being recessed at intervals, and lugs formed upon the outer or front wall of said eaves-bar opposite the said recesses, of glazing-bars, substantially as described, extending through the recesses of the eaves-bar and contacting with the lugs thereon, an eyebolt located within each of the glazing-bars and passed through the forward walls of the eaves-bar, and a tie-bolt passed through the eyebolt and the eaves frame and bar, substantially as and for the purpose specified.

21. In a glazed structure, the combination, with a series of glazing-bars arranged at each side of the ridge, of a ridge-bar curved at its top and recessed to receive the upper ends of the glazing-bars, the metal of the said ridge-bar being bent from the under face downward across the inner ends of the glazing-bars and beneath said bars for attachment to the ridge angle-irons of the structure, substantially as shown and described.

22. In a glazed structure, the combination of a series of glazing-bars arranged at each side of the ridge and provided with recesses in their upper ends, and a ridge-bar having a cylindrical top recessed to receive and contact with the exterior of the glazing-bar, the metal of the said ridge-bar being carried diagonally downward at each side covering the upper ends of the glazing-bars, and also carried within the recesses of said bars, forming an apertured gutter, and thence downward beneath the glazing-bars, and means, substantially as described, for securing the ridge-bar and the upper ends of the glazing-bars to the ridge-irons of the structure, as specified.

23. In a glazed structure, the combination, with the glass-receiving gable-rail of the structure and the ridge-bar, of a flashing secured to and covering the said rail and extending up within the ridge-bar, re-enforcing plates bearing against the face of the flashing and capping the ends of the ridge-bar, a clamping-bolt located within the ridge-bar, having an eye at its inner end, and a threaded outer end provided with a lock-nut extending through the flashing and re-enforcing plates, and a tie-bolt passed horizontally through the ridge-bar and the eye of the clamping-bolt, substantially as and for the purpose specified.

WILLIAM H. COULSON.

Witnesses:
J. F. ACKER, Jr.,
EDGAR TATE.